United States Patent
Patel et al.

(10) Patent No.: US 7,269,711 B2
(45) Date of Patent: Sep. 11, 2007

(54) METHODS AND APPARATUS FOR ADDRESS GENERATION IN PROCESSORS

(75) Inventors: Rajesh B. Patel, Austin, TX (US); Robert L. Farrell, Gold River, CA (US); James E. Phillips, Round Rock, TX (US); Belliappa Kuttanna, Austin, TX (US); Scott E. Siers, Elk Grove, CA (US); T. W. Griffith, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 10/747,764

(22) Filed: Dec. 29, 2003

(65) Prior Publication Data

US 2005/0144423 A1 Jun. 30, 2005

(51) Int. Cl.
*G06F 12/00* (2006.01)

(52) U.S. Cl. .................... 711/220; 711/212

(58) Field of Classification Search ................ 711/220
See application file for complete search history.

(56) References Cited

U.S. PATENT DOCUMENTS

| | | | | |
|---|---|---|---|---|
| 5,233,553 A * | 8/1993 | Shak et al. | ............ | 708/491 |
| 5,511,017 A * | 4/1996 | Cohen et al. | ............ | 708/491 |
| 5,970,512 A * | 10/1999 | Martens et al. | ............ | 711/205 |
| 6,066,965 A * | 5/2000 | Blomgren et al. | ............ | 326/95 |
| 6,105,126 A * | 8/2000 | Check et al. | ............ | 712/210 |
| 6,105,129 A * | 8/2000 | Meier et al. | ............ | 712/222 |
| 6,209,076 B1 * | 3/2001 | Blomgren | ............ | 711/214 |
| 6,457,115 B1 * | 9/2002 | McGrath | ............ | 711/220 |
| 2002/0194452 A1* | 12/2002 | Catherwood | ............ | 711/220 |
| 2003/0093775 A1* | 5/2003 | Hilton | ............ | 717/138 |

OTHER PUBLICATIONS

*P6 Family of Processors: Hardware Developer's Manual*, Intel Corporation, Sep. 1998, 16 pages.
*IS 32 Intel Architecture Software Developer's Manual*, vol. 3: System Programing Guide, Intel Corporation, 2003, Chapter 2: System Architecture Overview, pp. 2.1-2.7.
*IS 32 Intel Architecture Software Developer's Manual*, vol. 3: System Programing Guide, Intel Corporation, 2003, Chapter 3: Protected-Mode Memory Management, pp. 3.1-3.38.
*IA-32 Intel® Architecture Optimization*: Reference Manual, Intel Corporation, 2003, Chapter 1: IA-32 Intel® Architecture Processor Family Overview, pp. 1.1-1.34.
*IA-32 Intel® Architecture Software Developer's Manual*, vol. 1: Basic Architecture, Intel Corporation, 2003, Chapter 3: Basic Execution Environment, pp. 3.1-3.17.

* cited by examiner

*Primary Examiner*—Reba I. Elmore
(74) *Attorney, Agent, or Firm*—Hanley, Flight & Zimmerman, LLC

(57) ABSTRACT

Methods and apparatus to generate addresses in processors are disclosed. An example address generator disclosed herein includes an adder to add a first address component and a second address component to generate an address, a correction indicator to indicate if the address is correct, and a control input to modify an operation of the adder.

41 Claims, 9 Drawing Sheets

METHODS AND APPARATUS FOR ADDRESS GENERATION IN PROCESSORS

FIELD OF THE DISCLOSURE

This disclosure relates generally to processors, and, more particularly, to methods and apparatus for address generation in processors.

BACKGROUND

Processing speed, also known as processing horsepower, is a primary concern in the design and commercial success of a processor. The personal computer is a prime example of how processing speed has become a critical feature in the eyes of the consumer. Consumers expect advertised processor speeds, often measured in terms of the processor clock rate, to increase on an annual, or even semi-annual, basis. Moreover, today's applications require processors with much greater horsepower than just a few years ago. For example, computer games and applications, such as word processors and databases, designed for a computer today are often not able to execute in a useful way on the slower processors of only a few years ago. Additionally, as software developers continue to add more features to existing applications, processor horsepower needs to increase accordingly so that the user experience remains constant. As a result, identifying techniques to increase processor speed is an ever-present goal of the processor designer and manufacturer.

To create feature-rich operating systems and applications that will be successful in the marketplace, most of today's computer software is written for 32-bit processors, i.e., processors whose address space is indexed using 32 bits. Processors architected for 32-bit addressing have numerous advantages over their 16-bit predecessors, including the ability to support larger program memory requirements and the ability to support more complex instructions that can perform multiple functions in a single clock cycle. However, because consumers expect to be able to use existing, or legacy, applications on a newly purchased computer, typical 32-bit processors are designed to support both 32-bit addressing and the legacy 16-bit addressing. The need to support the legacy 16-bit addressing places an additional burden on the processor designer who is attempting to increase the speed of the 32-bit processor. This is especially true with regards to address generation as the address generator is a key component affecting processor speed and the additional logic needed to support 16-bit addressing increases the critical-path delay of the address generation circuit. The increase in the critical-path delay results in a reduction in processor speed during the execution of 32-bit software.

Fortunately, as operating systems and applications have been migrating from 16 bits to 32 bits, the number of legacy 16-bit programs in active use has dwindled considerably. Additionally, the speed of today's 32-bit processor has improved considerably as compared to the state-of the-art 16-bit processors of several years ago. Thus, the 16-bit address generation logic need not be implemented as efficiently as in the past to still achieve substantially equivalent program execution performance.

Furthermore, processors are beginning to incorporate mechanisms to support aggressive, out-of-order instruction execution with data speculation. Such processors are typically capable of executing multiple program threads in parallel. Software compilers for such processors may speculate as to how to organize the code to execute in these parallel threads to achieve as efficient execution as possible. However, the speculation may not always be correct as it is often difficult, if not impossible, to determine the complete program execution flow a-priori. For example, conditional execution programming constructs (e.g., an if-then-else statement) may determine which of several possible code segments is executed at run time. Moreover, two or more threads executing in parallel may need to access the same data variable, resulting in a data dependency. If one or more of these threads accesses the data variable out-of-sequence with respect to the overall program execution flow, a data dependency violation may occur. Thus, a processor supporting out-of-order instruction execution needs to have a mechanism for recovering from incorrect instruction execution, e.g., due to a misspeculation based on conditional execution of an unexpected code segment, a data dependency violation, etc. This recovery mechanism typically includes address correction logic that allows the processor to recompute and/or replace one or more address components of a previously executed instruction prior to rescheduling the instruction for re-execution.

DETAILED DESCRIPTION

As mentioned previously, the address generator is a key component that affects overall processor speed. However, modern processors often need to support program code written for legacy processors that have a different address size. Thus, the address generator may need to support two or more address sizes, e.g., a normal address size and a legacy address size. Moreover, the logic added for the generation of the legacy address or addresses may have a negative impact on the speed with which the normal address is generated. As the need to support legacy code dwindles, and with the advent of processing architectures that support instruction recovery, mechanisms that increase the speed with which normal addresses can be generated while still supporting the generation of legacy addresses are possible.

Figure 1:
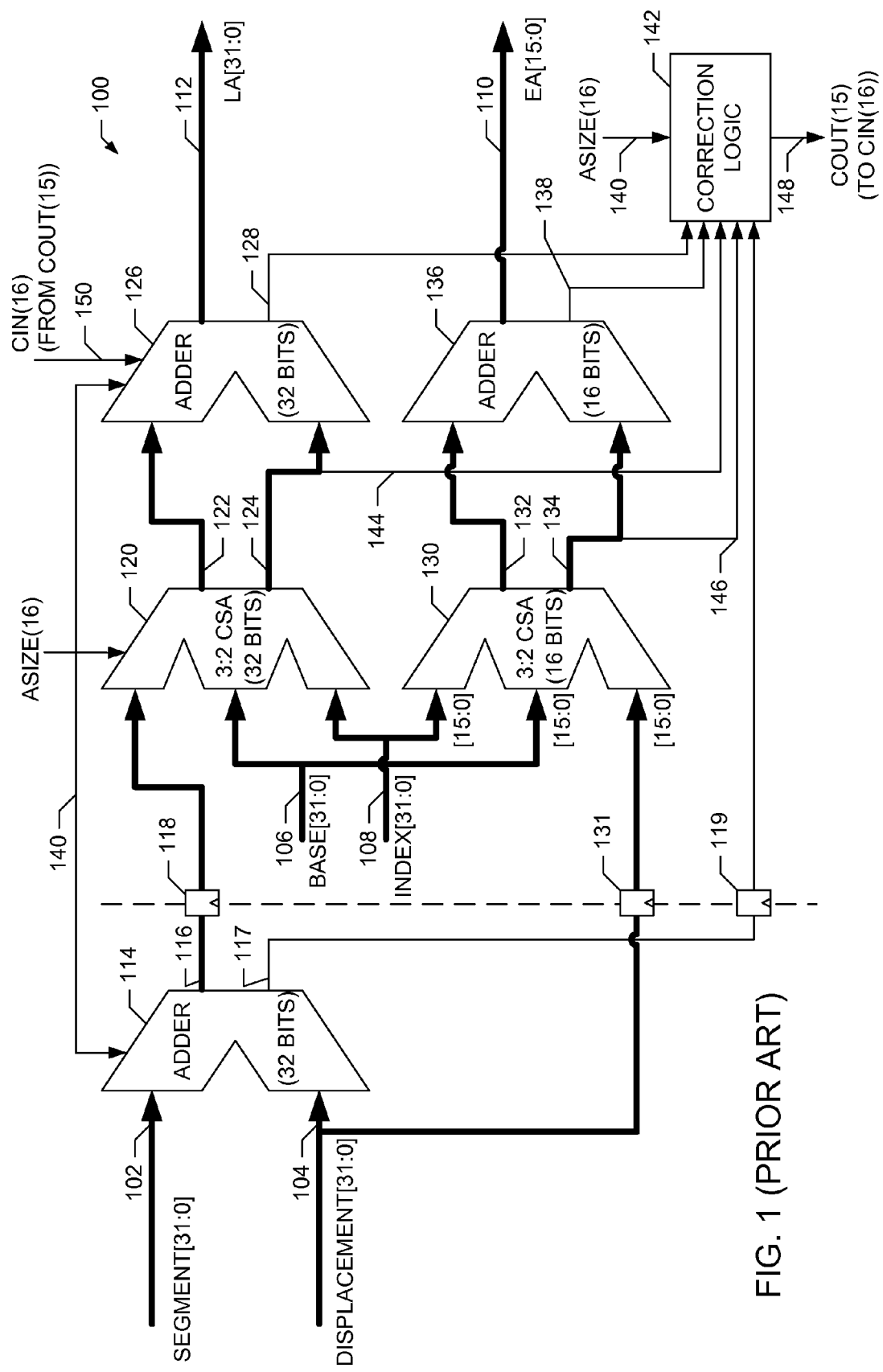
FIG. 1 is a schematic illustration of an example prior art address generator that supports 32-bit and 16-bit address generation.

To illustrate the limitations associated with existing techniques for supporting both normal and legacy address generation, an example prior art address generator 100 is shown FIG. 1. The example address generator 100 supports both normal 32-bit address generation and legacy 16-bit address generation. For both address types, the addresses are generated from a set of address components, including, a segment 102, a displacement 104, a base 106 and an index 108. The address generator 100 generates two address outputs, referred to herein as an effective address 110 and a linear address 112. In the example of FIG. 1, the effective address 110 is determined via the mathematical expression:

effective address=displacement+base+index.

Similarly, the linear address 112 is determined via the mathematical expression:

linear address=effective address+segment.

The effective address 110 comprises a displacement 104, a base 106 and an index 108 to allow the processor to support different addressing modes, thereby allowing software developers to write efficient program code. For example, the base 106 may be used to point to the start of an array, and then the displacement 104 may be used to point to an element of the array. The index 108 may be used to point to elements in a two-dimensional array, or specify a word-size for the elements in the array. Typically, the linear address 112 points to a physical location in memory. The linear address 112 comprises a segment 102 and an effective address 110 to allow the processor memory to be organized into segments. This memory organization, for example, allows the processor to support an expandable memory region and reduces the number of bits needed to represent the address components of many of the processor's instructions.

The following description of the example address generator 100 in FIG. 1 focuses on the generation of legacy 16-bit addresses because the additional logic needed to support legacy address generation is a key factor affecting the address generator's critical path during the execution of 32-bit code. For 16-bit address generation, the effective address components (the displacement 104, the base 106 and the index 108) are all 16 bits, and, therefore, the effective address 110 is also 16 bits. The segment 102, however, is still 32 bits and, thus, the linear address 112 is a 32-bit value. Furthermore, in the example address generator 100, the processor provides the segment 102 and the displacement 104 at least one clock cycle before the base 106 and the index 108. As a result, the address generator 100 reorders the address computation to take advantage of the differing arrival times of the different address components, as described below.

The address generator 100 includes a 32-bit adder 114 to add the segment 102 and the displacement 104. The adder 114 produces a sum output 116 and a carry bit 117 corresponding to an output carry from the $16^{th}$ most significant bit position. The sum output 116 and the carry bit 117 are denoted as EARLYADD_SUM and EARLYADD_COUT 15, respectively. Staging elements 118 and 119 are provided to buffer EARLYADD_SUM 116 and EARLYADD_COUT (15) 117, respectively, until the base 106 and the index 108 are available. EARLYADD_SUM 116 is then added with the base 106 and the index 108 (the latter two components arriving at least one clock cycle after the segment 102 and the displacement 104) using a 32-bit 3:2 carry save adder 120. The carry save adder 120 produces a sum output 122 and a carry output 124. The sum output 122 and the carry output 124 are then added by a 32-bit adder 126 to produce the lower 16 bits of the linear address 112, as well as a carry bit 128, denoted as LA_FA_COUT(15). LA_FA_COUT(15) 128 corresponds to a carry bit generated by the addition of the lower 16-bits in the adder 126.

To verify correct generation of a legacy 16-bit address, the address generator 100 also comprises a 16-bit 3:2 carry save adder 130 to add the lower 16 bits of displacement 104 (buffered by the staging element 131) with the lower 16-bits of the base 106 and the lower 16 bits of the index 108. The carry save adder 130 produces a sum output 132 and carry output 134. The sum output 132 and carry output 134 are then added by a 16-bit adder 136 to produce the effective address 110, as well as a carry bit 138, denoted as $LA_{13}$ $FA_{13}$ COUT(15).

For the case of 16-bit addition, each 32-bit adder 114, 120 and 126 is able to block the output carry generated by the lower 16 bits from propagating to the upper 16 bits, thus maintaining the proper truncation and wrap-around properties of 16-bit, binary arithmetic. The blocking of the appropriate output carry bit is controlled by the input ASIZE(16) 140 into the address generator 100. The input ASIZE(16) 140 is set to a logic ONE for the case of 16-bit address generation, and to logic ZERO for the case of 32-bit address generation.

However, as the segment 102 is a 32-bit binary number, the addition of it to the other address components may result in a carry that needs to propagate from the lower 16 bits to the upper 16 bits in the generation of the linear address 112. The input ASIZE(16) 140 may cause all such carries to be blocked and, therefore, the correction logic 142 is needed to determine if a carry bit equal to a logic ONE should be added to the upper 16 bits during the calculation of the linear address 112. The correction logic 142 accepts as input ASIZE(16) 140, as well as the output carry bits from the adders 114, 120, 126, 130 and 136 resulting from the lower 16 bit additions. Specifically, these inputs include: EARLYADD_COUT(15) 117, LA_FA_COUT(15) 128, EA_FA_COUT(15) 138, the $16^{th}$ most significant output carry bit of the carry save adder 120, denoted as LA_CSA_COUT(15) 144, and the $16^{th}$ most significant output carry bit of the carry save adder 130, denoted as EA_CSA_COUT(15) 146. The correction logic 142 examines the output carry bits to determine if all carry bits correspond to the generation of the effective address 110. If so, no additional carry is needed to generate the upper 16 bits of the linear address 112, and, thus, the output 148 of the correction logic 142, denoted as COUT(15), is set to a logic ZERO. Otherwise, an additional carry is needed, and COUT(15) 148 is set to a logic ONE. The output COUT(15) 148 of the correction logic 142 then drives the input carry CIN(16) 150 for the addition of the upper 16 bits in the adder 126.

As can be seen in FIG. 1, the correction logic 142 lies directly in the critical path for generation of the upper 16 bits of the linear address 112. Thus, the propagation delay of the signals through the correction logic 142 places a limitation on the rate at which 16-bit addresses may be generated. Even worse, the propagation delay through the correction logic also impacts 32-bit address generation, and, thus, overall processor speed.

An example processor 200 to address some of the limitations described above is shown in FIG. 2. The processor 200 includes an instruction scheduler 202 to schedule instructions for execution. To prepare an instruction for execution, the instruction scheduler 202 passes a set of address components 204, such as a segment, a displacement, a base and an index, to an address generator 206. The address generator 206 may, for example, generate one or more linear addresses for the instruction using the aforementioned address components 204. The linear address, for example, may point to a physical location in memory wherein an argument of the instruction is located.

The example address generator 206 has two other control inputs: a size input 208 and a force-carry (FC) input 210. The size input 208 is used to specify the size of the address 211 being generated. For example, the address generator may support generation of both a normal size address (e.g., a 32-bit address) and a legacy size address (e.g., a 16-bit address). The force-carry input 210 is used to modify an operation within the address generator 206. In the example address generator 300 of FIG. 3 described below, the force-carry input 210 modifies the value of a carry-bit of an adder within the address generator 206 depending on the address size indicated by the size input 208.

The example address generator 206 has two more outputs in addition to the generated addresses 211: a correction indicator output 212 and a force carry value output 214. The correction indicator 212, also known as the "need correction" (NC) indicator 212, is an output generated by the address generator to indicate that the generated address 211 is incorrect. The force carry value output 214 is an optional output that may be used, for example, to indicate the state of the force carry input 210 during the preceding address generation, or to output the value of a particular carry bit determined during the generation of the most recent address 211.

The example processor 200 also comprises a recovery mechanism for recovery from erroneous instruction execution, for example, due to out-of-order, speculative processing. The recovery mechanism includes a recovery queue 218 to store pending instructions, and a recovery control unit 220 to determine how the instructions pending in the recover queue 218 should be processed. As part of the scheduling process, the instruction scheduler 202 passes instructions to the recovery queue 218 to store temporarily until the results of executing the instruction are confirmed and committed to the overall program execution flow. For example, the processor may contain an instruction retirement unit (not shown) that makes this determination. If the results of executing the instruction are deemed valid, the recovery control unit 220 will cause the recovery queue 218 to remove the corresponding instruction from its temporary storage. If the results are invalid, the recovery control unit 220 will cause the recovery queue 218 to reschedule the affected instruction for execution, possibly after modifying a portion or portions of the instruction to be scheduled.

For the purposes of address generation, the recovery control unit 220 may be modified to accept the correction indicator 212 as another input to signal another condition by which the execution of an instruction may be invalid. The recovery control unit 220 may also be modified to accept the force carry value 214 as an input to indicate how the instruction needs to be modified prior to rescheduling the instruction for re-execution (specifically, how the generation of the affected address needs to be modified). In the case of an incorrect address as indicated by the correction indicator 212, the recovery control unit 220 may modify the force carry input 210 to the address generator and the recovery queue 218 may apply the address components 204 to the address generator.

Figure 2:
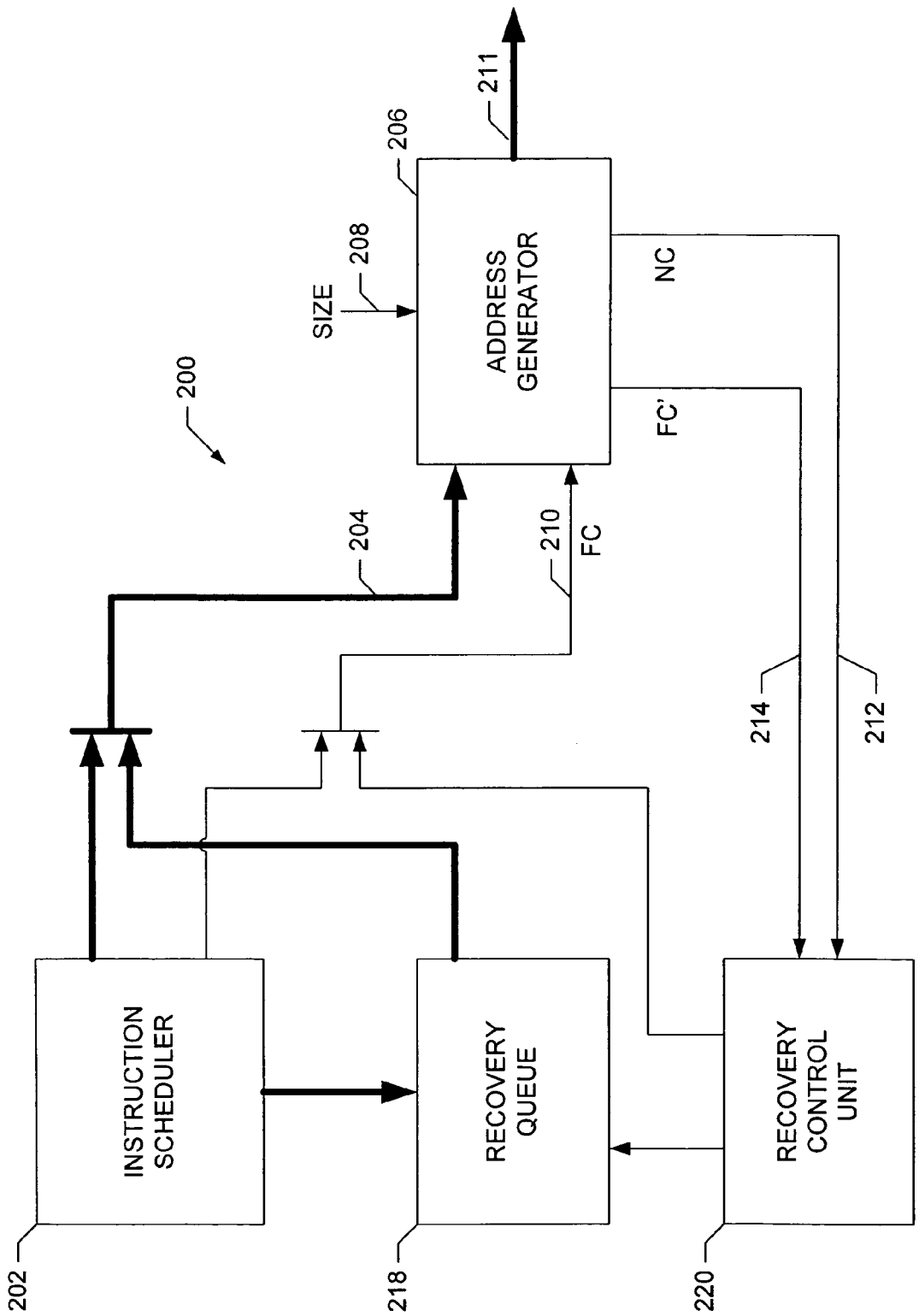
FIG. 2 is a schematic illustration of an example processor having a recovery mechanism for incorrect address generation.

In the example of FIG. 2, the address generator 206 is designed so that the propagation delay for normal address generation is minimized, whereas legacy address generation may have additional propagation delay (resulting in a slower processing speed for legacy addresses). In addition, the address generator 206 is designed so that the generation of a normal address is always correct, whereas the generation of a legacy address may result in an incorrect value. Specifically, returning to the example address generator 100 in FIG. 1, the address generator 206 operates in a manner substantially equivalent to assuming that the output 148 of the correction logic 142 is a particular value and then using this value in the generation of the linear address 112. By assuming a value for the output 148, the propagation delay through the correction logic 142 no longer impacts the time required to generate the upper 16 bits of the linear address 112. However, the assumed value may be incorrect. If this is the case, then the address must be regenerated using a different assumed value for the output 148. In this way, the speed with which normal addresses are generated may be improved at the expense of possible errors in the generation of legacy addresses, with any such errors necessitating the regeneration of the legacy address or addresses. However, given the significant horsepower of modern processors, this added delay may have little to no impact to the legacy code's user experience.

Given the previous description of the individual elements of the example processor 200, the overall procedure for generating an address may now be described. As part of scheduling an instruction for execution, the instruction scheduler 202 passes the instruction to the recovery queue 218 for temporary storage, and provides the address components 204 to the address generator 206. If the size 208 of the address corresponds to a normal address (for example, as determined by an instruction decoder not shown in FIG. 2), the address generator 206 determines the correct linear address 211. The correction indicator 212 and the force carry value output 214 are ignored as they are not applicable to normal address generation.

However, if the size 208 corresponds to a legacy address, the instruction scheduler 202 sets the value of the force carry input 210 to an initial value, for example, a logic ZERO. The address generator 206 generates the legacy address and determines if the address is correct as described in detail below. If the correction indicator 212 indicates that the address is correct, the recovery control unit 220 will not reschedule the instruction due to incorrect address generation (although the instruction may be rescheduled for other reasons, such as a data dependency violation, that are unrelated to the address generated by the address generator 206). If the correction indicator 212 indicates that the generated address is incorrect, the recovery control unit 220 will reschedule the instruction and cause the recovery queue 218 to provide the appropriate address components 204 to the address generator 206. Additionally, the recovery control unit will modify the force carry input 210, for example, by setting the input to a logic ONE based on the previous state of this input (logic ZERO) as indicated by the force carry value output 214.

One having ordinary skill in the art will appreciate that the preceding description is just one of many equivalent implementations that employ an address generator 206 having a force carry input 210 and a correction indicator 212 output. For example, the address generator 206 could be designed to default to a particular carry value for a legacy address, and the force carry input 210 could be used to signal the address generator 206 to toggle this value. Another example could employ prediction logic to set the carry-bit to a value based on the values of the address components 204, e.g., how likely the addition of the components will result in the carry-bit of interest being a logic ONE or a logic ZERO.

One having ordinary skill in the art will also recognize that a recovery mechanism as described above can be added to an example processor, such as processor 200, for the sole purpose of recovering from incorrect address generation. Thus, the example address generator 206 may be used in processors that do not inherently support out-of-order instruction execution, or the like.

Figure 3:
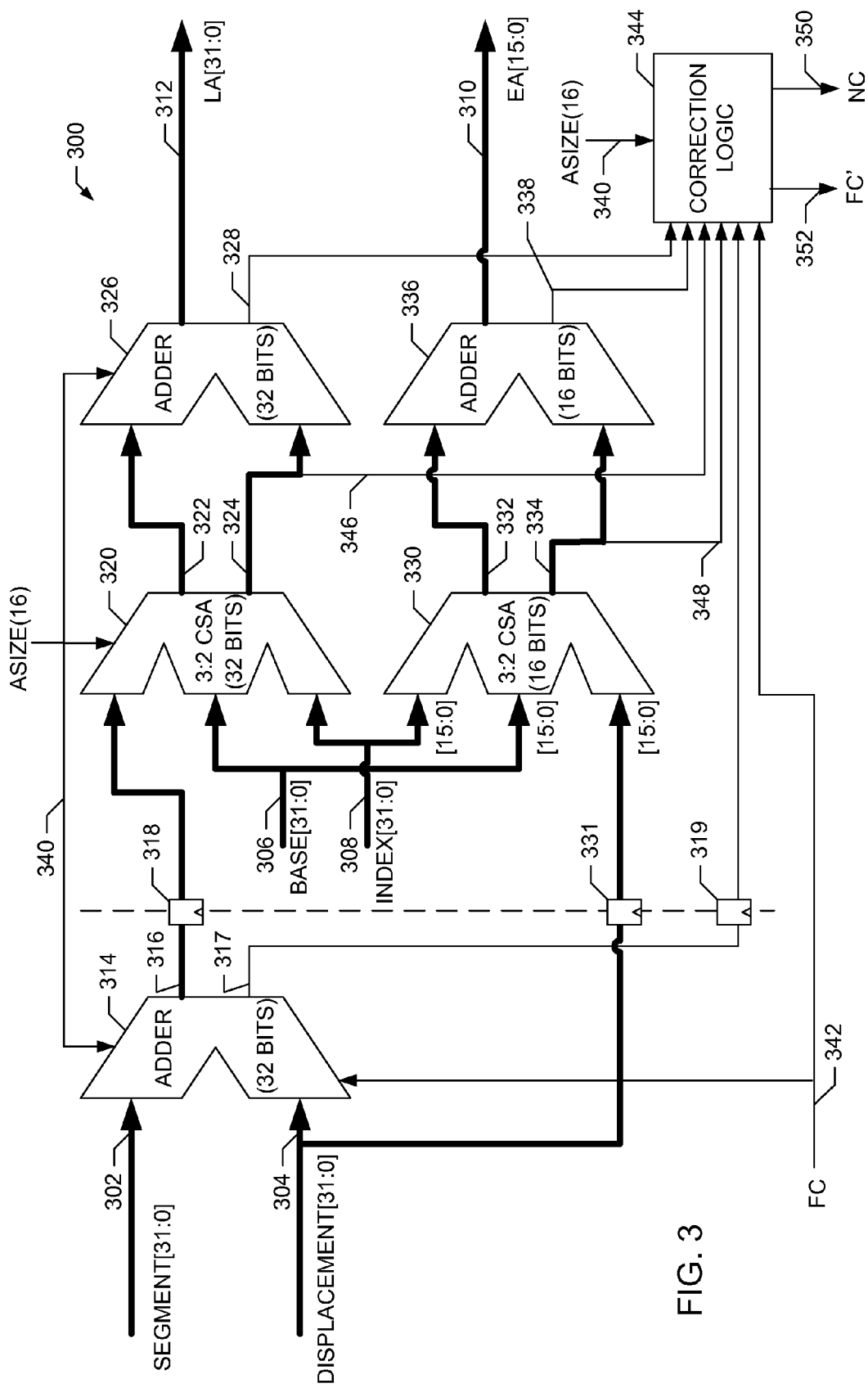
FIG. 3 is a schematic illustration of an example address generator that supports 32-bit and 16-bit address generation for the example processor of FIG. 2.

An example address generator 300, which may be used to implement the address generator 206 of FIG. 2, is shown in FIG. 3. The example address generator 300 supports both normal 32-bit address generation and legacy 16-bit address generation. For both address types, the addresses are generated from a set of address components, including, a segment 302, a displacement 304, a base 306 and an index 308. The address generator 300 generates two address outputs, the effective address 310 and the linear address 312, based on the mathematical expressions discussed previously.

For 16-bit address generation, the effective address components (the displacement 304, the base 306 and the index 308) are all 16 bits, and, therefore, the effective address 310 is also 16 bits. The segment 302, however, is still 32 bits and, thus, the linear address 312 is a 32-bit value. Furthermore, in the example address generator 300, the processor provides the segment 302 and the displacement 304 at least one clock cycle before the base 306 and the index 308. As a result, the address generator 312 reorders the address computation to take advantage of the differing arrival times of the different address components, described as follows.

As shown in FIG. 3, the address generator 300 includes a 32-bit adder 314 to add the segment 302 and the displacement 304. The adder 314 produces a sum output 316 and a carry bit 317 corresponding to an output carry from the 16$^{th}$ most significant bit position. The sum output 316 and the carry bit 317 are denoted as EARLYADD_SUM and EARLYADD_COUT(15), respectively. Staging elements 318 and 319 are provided to buffer EARLYADD_SUM 316 and EARLYADD_COUT(15) 317, respectively, until the base 306 and the index 308 are available. EARLYADD_SUM 316 is then added with the base 306 and the index 308 (the latter two components arriving at least one clock cycle after the segment 302 and the displacement 304) using a 32-bit 3:2 carry save adder 320. The carry save adder 320 produces a sum output 322 and carry output 324. The sum output 322 and carry output 324 are then added by a 32-bit adder 326 to produce all 32 bits of the linear address 312, as well as an output carry bit 328, denoted as LA_FA_COUT(15). LA_FA_COUT(15) 328 corresponds to a carry bit generated by the addition of the lower 16-bits in the adder 326.

To verify correct generation of a legacy 16-bit address, the address generator 300 also includes a 16-bit 3:2 carry save adder 330 to add the displacement 304 (buffered by the staging element 331) with the base 306 and the index 308. The carry save adder 330 produces a sum output 332 and a carry output 334. The sum output 332 and the carry output 334 are then added by a 16-bit adder 336 to produce the effective address 310, as well as a carry bit 338, denoted as EA_FA_COUT(15). EA_FA_COUT(15) 338 corresponds to the carry bit generated by the addition of the lower 16-bits in the adder 336.

For the case of 16-bit addition, each 32-bit adder 314, 320 and 326 is able to block the output carry generated by the lower 16 bits from propagating to the upper 16 bits, thus maintaining the proper truncation and wrap-around properties of 16-bit, binary arithmetic. The blocking of the appropriate output carry bit is controlled by the input ASIZE(16) 340 into the address generator 300. The input ASIZE(16) 340 is set to a logic ONE for the case of 16-bit address generation, and to logic ZLRO for the case of 32-bit address generation.

However, as the segment 302 is a 32-bit binary number, the addition of it to the other address components may result in a carry that should propagate from the lower 16 bits to the upper 16 bits in the generation of the linear address 312. The input ASIZE(16) 340 may cause all such carries to be blocked and, therefore, the address generator 300 includes a force carry input 342 to allow the value of this carry to be set to a particular value at the start of address generation. In this way, generation of the 32-bit linear address is not delayed due to the determination of the correct value for this carry-bit. However, if the force-carry input 342 causes the carry bit to be set to an incorrect value, then the resulting address will also be incorrect, thereby requiring that the linear address be regenerated using a different value for the force-carry input 342.

To determine if the generated linear address 312 based on the force carry input 342 is correct, the address generator 300 contains correction logic 344 to determine, for example, the correct value of the force carry input 342. Further detail pertinent to the correction logic 344 is provided below in conjunction with FIG. 4. In general, the correction logic 344 accepts as input the output carry bits from the adders 314, 320, 326, 330 and 336 resulting from the lower 16 bit additions. Specifically, these inputs include: EARLYADD_COUT(15) 317, LA_FA_COUT(15) 328, EA_FA_COUT(15) 338, the 16$^{th}$ most significant output carry bit of the carry save adder 320, denoted as LA_CSA_COUT(15) 346, and the 16$^{th}$ most significant output carry bit of the carry save adder 330, denoted as EA_CSA_COUT(15) 348. The correction logic 344 examines the output carry bits to determine if all carry bits correspond to the generation of the effective address 310. If so, no additional carry is needed to generate the upper 16 bits of the linear address 312, and, thus, the correction indicator output 350 of the correction logic 344, denoted as NC for "need correction," is set to a logic ZERO. Otherwise, an additional carry is needed, and correction indicator 350 is set to a logic ONE. The correction indicator 350 of the correction logic 344 is output from the address generator 300 for use by the processor's recovery mechanism (as described above for the example processor 200 of FIG. 2) to determine whether the generated legacy address is incorrect and needs to be regenerated using a different value for the force carry input 342. The correction logic 344 may also provide a force carry value output 352 that is representative of the previous value of the force carry input 342 to aid the recovery mechanism in determining the appropriate new value for the force carry input 342.

For the generation of normal 32-bit addresses, the ASIZE (16) input 340 is set so that the carries generated by the lower 16 bits are allowed to propagate to the upper 16 bits in the 32-bit adders 314, 320 and 326. Thus, the force-carry input 342 and the correction indicator 350 and the forced carry value output 352 may be ignored as the generated 32-bit address will be correct. Thus, the correction logic 344 needed for 16-bit address generation has no negative impact on 32-bit address generation.

Figure 4:
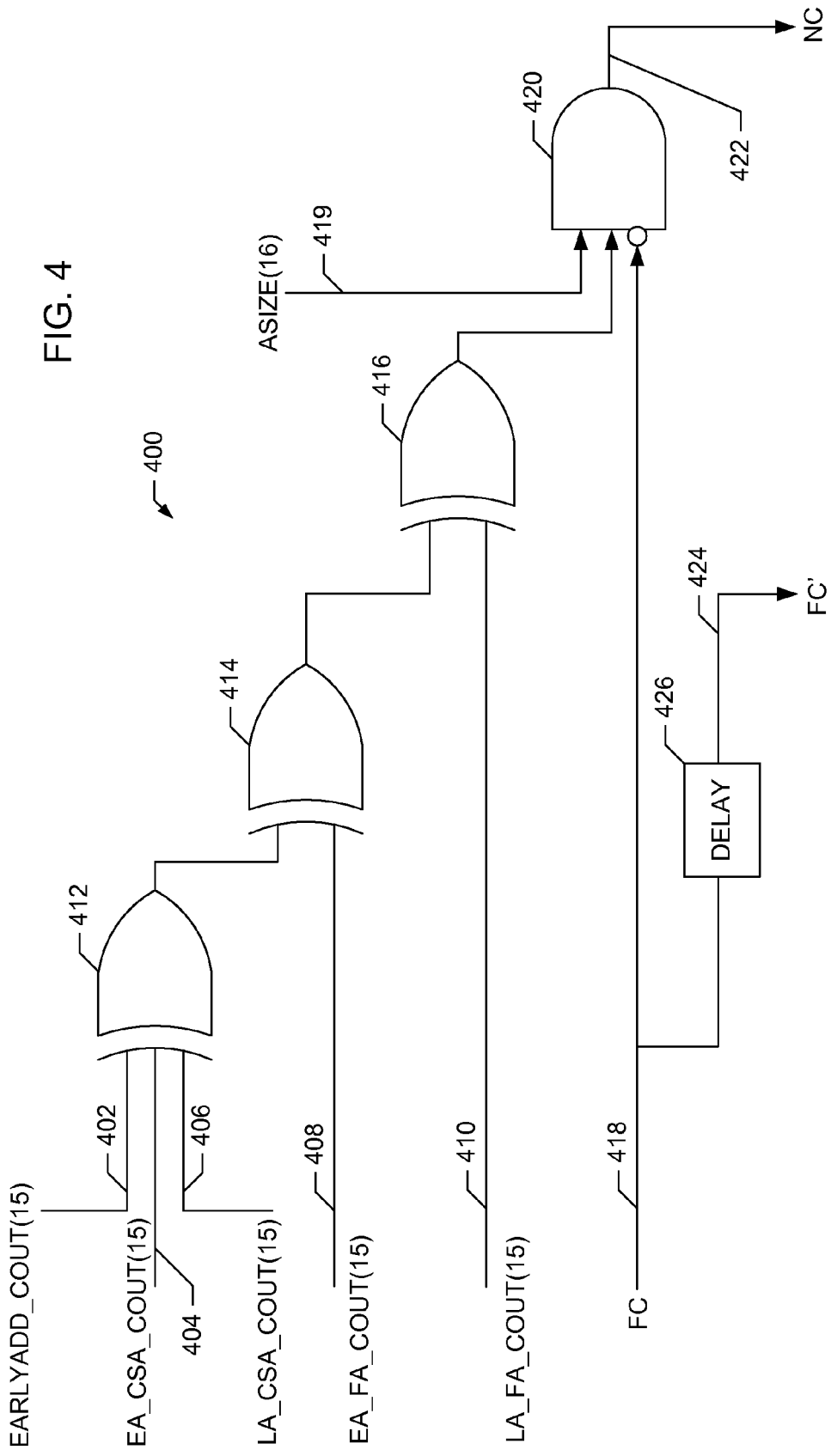
FIG. 4 is a more detailed schematic illustration of the correction logic of FIG. 3.

FIG. 4 depicts an example correction logic circuit 400 that could be used to implement the correction logic 300 of FIG. 3. The example correction logic circuit 400 accepts as input the following five output carry bits as described above: EARLYADD_COUT(15) 402, EA_CSA_COUT(15) 404, LA_CSA_COUT(15) 406, EA_FA_COUT(15) 408 and LA_FA_COUT(15) 410. An exclusive-OR (XOR) operation (XOR gate 412) is performed on EARLYADD_COUT(15) 402, EA_CSA_COUT(15) 404, and LA_CSA_COUT(15) 406. An XOR operation (XOR gate 414) is then performed on the output of the XOR gate 412 and EA_FA_COUT(15) 408. Next, an XOR operation (XOR gate 416) is performed on the output of the XOR gate 414 and LA_FA_COUT(15) 410. Thus, the example circuit 400 performs an XOR operation on all five output carry bits.

Returning to FIG. 3, one having ordinary skill in the art will recognize that the XOR operation performed by the example circuit 400, in essence, compares a first set of carry bits EA_CSA_COUT(15) 348 and EA_FA_COUT(15) 338) generated during the computation of the effective address 310 to a second set of carry bits EARLYADD_COUT(15) 317, LA_CSA_COUT(15) 346 and LA_FA_COUT(15) 328) generated in the computation of the linear address 312. If the same number of carry bits are equal to logic ONE in both sets (corresponding to a logic ZERO at the output of XOR gate 416), then these carries must all correspond to the computation of the effective address. Therefore, a carry bit equal to logic ZERO was generated as a result of adding the effective address to the segment (in a mathematical sense). As a result, a force carry input 342 equal to a logic ZERO would cause a correct linear address to be generated. However, if the number of carry bits equal to a logic ONE is different in the two sets (corresponding to a logic ONE at the output of XOR gate 416), then a carry-bit equal to logic ONE must have been generated as a result of adding the effective address to the segment (in a mathematical sense). As a result, a force carry input 342 equal to a logic ONE would cause a correct linear address to be generated.

Returning to FIG. 4, the example correction logic circuit 400 accepts the force carry as an input 418 and the address size ASIZE(16) as input 419. The example circuit 400 is designed assuming that, for legacy 16-bit address generation, the ASIZE(16) input 419 is a logic ONE and the first attempt at generating the linear address uses a default force carry input 418 equal to a logic ZERO. Then, an AND operation (AND gate 420) is performed on the inverse of the force carry input 418, the AS1ZE(16) input 419 and the output of the XOR gate 416 to produce the correction indication output 422, which corresponds to the correction indication output 350 of FIG. 3. The AS1ZE(16) input 419 is included in the AND operation so that a correction indication output 422 equal to a logic ONE can occur only for legacy 16-bit addresses. During the first generation attempt when the force-carry input 418 is equal to a logic ZERO, the correction indication output 422 is equal to the output of the XOR gate 416. Thus, if the output of the XOR gate 416 is equal to a logic ZERO, then the force carry input 418 was properly set to a logic ZERO and the correction indicator 422 is set to logic ZERO, thereby indicating that no correction is needed. If the output of the XOR gate 416 is equal to a logic ONE, then the force carry input 418 was incorrectly set to a logic ZERO and the correction indicator 422 is set to a logic ONE, thereby indicating that a correction is needed. If a correction is needed, on the second attempt the force value input will be equal to a logic ONE, thus forcing the correction indicator 422 to be a logic ZERO for the second attempt, thereby indicating that the generated address is now correct.

One having ordinary skill in the art will note that other circuit configurations could be used to compare the output of the XOR gate 416 to the force carry input 418. For example, a coincidence operation (i.e., the inverse of the XOR operation) could be performed on the output of the XOR gate 416 and the force carry input 418 to determine if the generated carry value is equal to the force carry input. Alternatively or additionally, the ASIZE(16) input 419 could be removed from the example correction logic circuit 400 if the recovery mechanism is able to ignore a correction indication output 422 corresponding to a normal 32-bit address.

The example correction logic circuit 400 also includes a force carry value output 424 that is formed by delaying the force carry input 418 using a delay element 426. The force carry value output 424 corresponds to the force carry value output 352 of FIG. 3.

Figure 5:
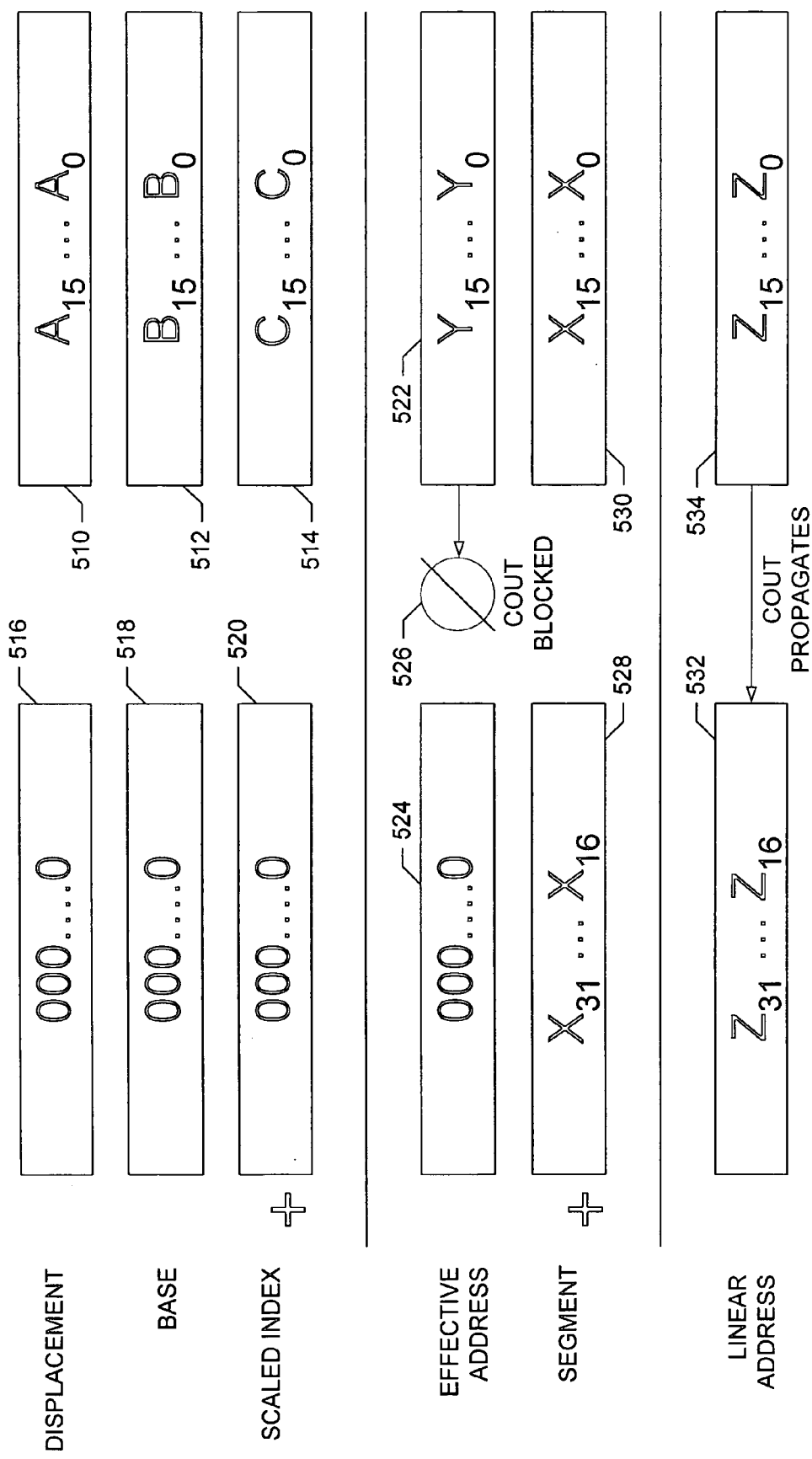
FIG. 5 illustrates the mathematical definition of an example legacy effective address and linear address.

To better understand the generation of the effective address 310 and linear address 312 of FIG. 3 from a mathematical perspective, FIG. 5 illustrates the mathematical definition of an example 16-bit effective address and linear address. Note that the example of FIG. 5 is provided to more clearly illustrate the definition of the effective address and linear addresses mentioned previously, and neither the example prior art address generator 100 of FIG. 1 or the example address generator 300 of FIG. 3 actually perform the sequence of addition operations exactly as shown in FIG. 5. As described previously, the effective address 310 and the linear address 312 are determined from the displacement 304, base 306 and index 308 via the following mathematical equations:

$$\text{effective address} = \text{displacement} + \text{base} + \text{index}$$

and:

$$\text{linear address} = \text{effective address} + \text{segment}.$$

As illustrated in FIG. 5, for the case of legacy 16-bit address generation, the lower 16 bits of the displacement 510, the base 512 and the index 514 (also known as the scaled index as the index may be scaled by a constant representative of the word width) are the 16-bit values represented by $A_{15} \ldots A_0$, $B_{15} \ldots B_0$ and $C_{15} \ldots C_0$, respectively. The upper 16 bits of the displacement 516, the base 518 and the index 520 are all set to logic ZEROs because the address components are restricted to 16 bits for this case. The aforementioned address components are then summed to produce the 16-bit effective address, wherein the lower 16 bits of the effective address 522 are represented by $Y_{15} \ldots Y_0$, and the upper 16 bits of the effective address 524 are forced to all logic ZEROs by blocking any potential logic ONEs that may be generated as the carry out bits of the $16^{th}$ and $17^{th}$ bit positions (526) due to the summation of the three previous 16-bit address components.

The resulting effective address 522, 524 is then added to the 32-bit segment, wherein the upper 16 bits 528 and the lower 16 bits 530 of the segment are represented as $X_{31} \ldots X_{16}$ and $X_{15} \ldots X_0$, respectively. The result of this addition is the 32-bit linear address, wherein the upper 16 bits 532 and the lower 16 bits 534 of the segment are represented as $Z_{31} \ldots Z_{16}$ and $Z_{15} \ldots Z_0$, respectively. Note that all carries are allowed to propagate in this final addition as the result is a 32-bit value.

Figure 6:
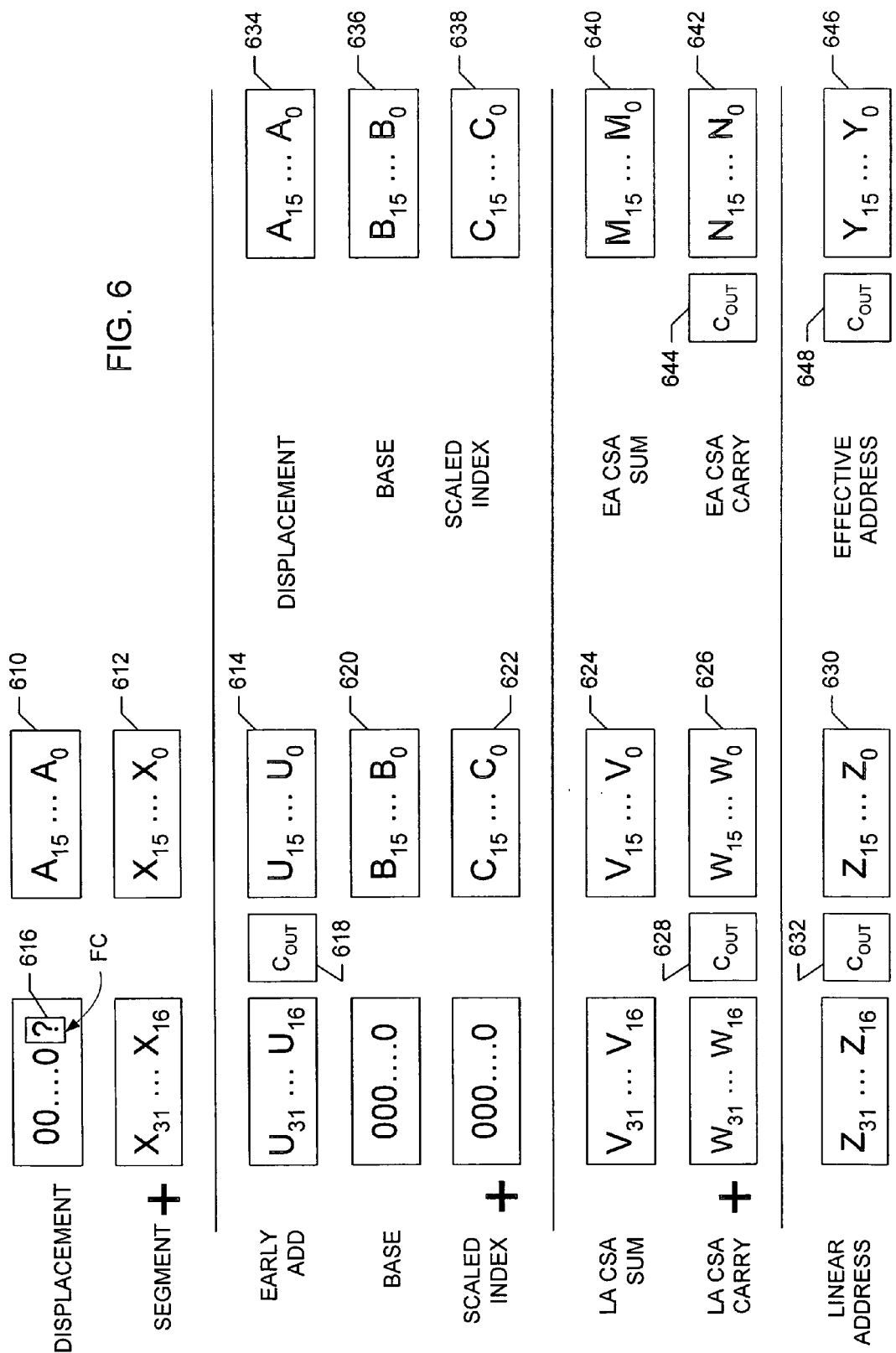
FIG. 6 illustrates the generation of an example 16-bit address as performed by the example address generator of FIG. 3.

As mentioned previously, the addition operations in the example address generator 300 of FIG. 3 are reordered to take advantage of the segment 302 and displacement 304 being available at least one clock cycle before the base 306 and the index 308. To better understand the mathematical operation of the example address generator 300, FIG. 6 illustrates the calculation of an example 16-bit address as performed by the example address generator 300. The example address generator 300 computes the legacy linear address 312 (via 32-bit adders 314, 320 and 326) and the effective address 310 (via 16-bit adders 330 and 336) in parallel. Turning to FIG. 6, the address generator 300 adds the displacement 610 and the segment 612 to determine the "early add" output 614. The early add output 614 also includes the addition of the force carry input 616 that is set to either a logic ZERO or a logic ONE at the start of the address computation. However, as mentioned previously, the output carry 618 from the addition of the lower 16 bits of the displacement 610 and the segment 612 is blocked during legacy 16-bit address generation. Thus, the 32-bit early add output 614 is, in effect, the result of two separate 16-bit additions, namely, the addition of the lower 16 bits of the displacement 610 and the segment 612, and the addition of the upper 16 bits of the segment 612 to the force carry input 616.

Next, the early add output 614 is added with the base 620 and the index 622 via a 3:2 carry save adder to produce a 32-bit sum output 624 and a 32-bit carry output 626. Similar to before, the output carry 628 generated during the addition the lower 16 bits of the early add output 614, the base 620 and the index 622 is blocked during legacy 16-bit address generation. Finally, the sum output 624 and the carry output 626 are added to produce the legacy linear address 630, again with the output carry 632 from the 16$^{th}$ bit position being blocked for legacy 16-bit address generation.

The example address generation 300 computes the legacy 16-bit effective address in parallel with the linear address as follows. The displacement 634 (corresponding to the lower 16 bits of the displacement 610) is added with the base 636 (corresponding to the lower 16 bits of the base 620) and the index 638 (corresponding to the lower 16 bits of the index 622) via a 3:2 carry save adder to produce a 16-bit sum output 640 and a 16-bit carry output 642. An output carry 644 is generated during the 16-bit addition the lower 16 bits of the displacement 634, the base 636 and the index 638. The sum output 640 and the carry output 642 are added to produce the legacy effective address 646 and an output carry 648 from the 16$^{th}$ most significant bit position.

In many applications, only the linear address 630 is actually used by the processor, e.g., to access physical locations in memory. However, even in these instances, the computation of the effective address 646, specifically the computation of the blocked output carries described above, is still needed to determine whether the legacy linear address is valid. As described previously, output carries generated solely as a result of adding the address components that comprise the legacy 16-bit effective address should be blocked so that the output remains a 16-bit value. However, an output carry corresponding to the addition of the effective address and the segment to generate the legacy linear address should not be blocked, because the linear address is a 32-bit number in this example. Thus, the carries generated during the computation of the effective address can compared to the output carries generated during the computation of the linear address to determine whether or not all output carries having a value of logic ONE correspond to the effective address computation. If not, then an output carry needed for the computation of the linear address was incorrectly blocked, and the force carry input 616 should be set to a logic ONE to correctly generate the legacy linear address in the next attempt.

As can be seen from the example in FIG. 6, the address components are added in different sequences for the linear address 630 and the effective address 646. As a result, there is no one-to-one correspondence between the output carries generated during computation of the linear address and the output carries generated during computation of the effective address. However, given the similar adder structures used to compute the linear address and effective address (e.g., the 3:2 carry save adders), and because all relevant output carries are available, the total number of output carries having a value of logic ONE may be compared to determine whether the same number occur for the effective address computation as for the linear address computation. Specifically, the set of linear address output carries 618, 628 and 632 may be compared to the set of effective address output carries 644 and 648. If both sets contain the same number of logic ONE values, then all output carries were correctly blocked during the generation of the linear address because they all corresponded to the computation of the effective address. However, if both sets do not contain the same number of logic ONE values, then an output carry corresponding to the computation of the linear address was incorrectly blocked, and the correction indicator (e.g., output 350 of FIG. 3) should be set to a logic ONE to indicate that the resulting legacy linear address is incorrect. As described with respect to FIG. 4, the aforementioned comparison can be performed using an XOR operation.

Figure 7:
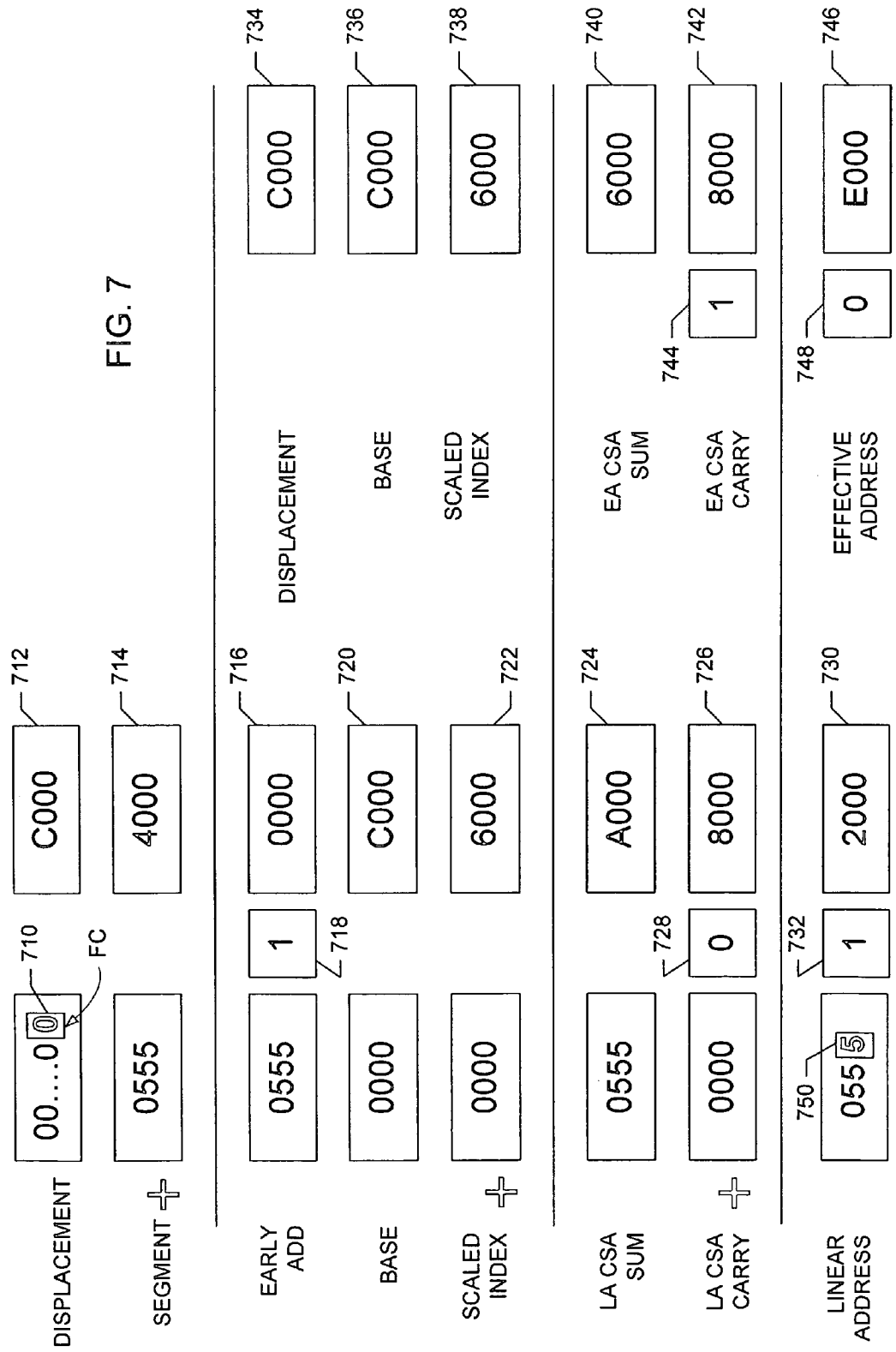
FIG. 7 depicts an example 16-bit address generation that results in an incorrect address produced by the example address generator of FIG. 3.
Figure 8:
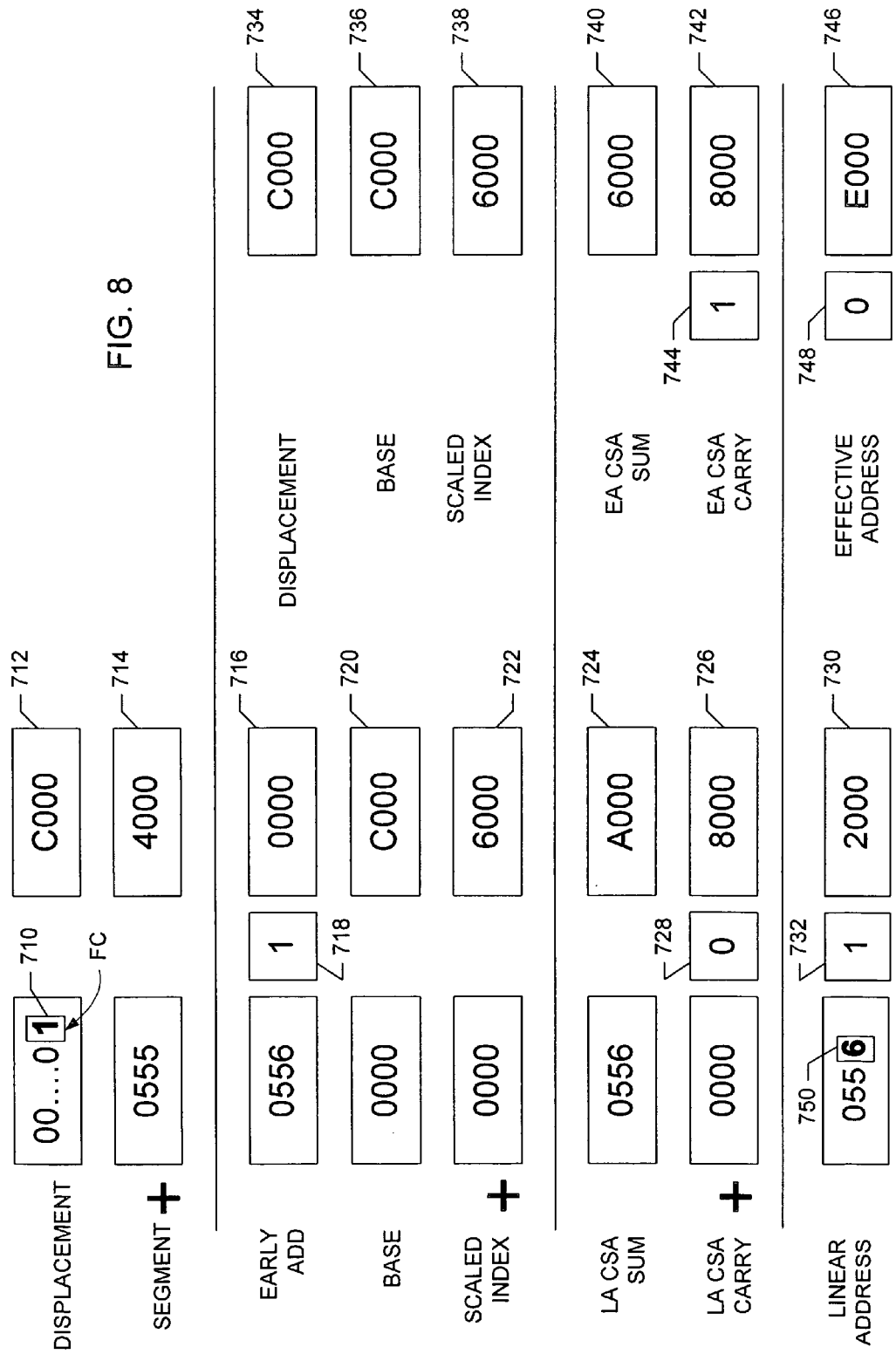
FIG. 8 depicts an example recovery from the incorrect 16-bit address generation demonstrated in FIG. 7 that may be carried out by the example address generator of FIG. 3.

FIGS. 7 and 8 illustrate a numerical example of the legacy address computations shown in FIG. 6. In this example, the address components are: segment=0x05554000, displacement=0xC000, base=0xC000 and index=0x6000 (where the prefix '0x' indicates that a number is represented in hexadecimal format). FIG. 7 shows the first attempt at generating the legacy addresses, so the force carry input 710 is set to a logic ZERO. The legacy linear address is generated as follows. The displacement value 0xC000 (block 712) and the segment value 0x05554000 (block 714) are added to produce an early add output 716, wherein the upper 16 bits and the lower 16 bits are 0x0555 and 0x0000, respectively. The addition also produces an output carry 718 from the lower 16 bits that is equal to a logic ONE, which is blocked for legacy 16-bit address generation. Next, the early add output value 0x05550000 (block 716), the base value 0xC000 (block 720) and the index value 0x6000 (block 722) are summed via a 3:2 carry save adder. The result is a sum output 724, wherein the upper 16 bits and the lower 16 bits are 0x0555 and 0xA000, respectively, and a carry output 726, wherein the upper 16 bits and the lower 16 bits are 0x0000 and 0x8000, respectively. The adder also produces an output carry 728 from the lower 16 bits that is equal to a logic ZERO, which is blocked for legacy 16-bit address generation. Finally, the sum output value 0x0555A000 (block 724) and the carry output value 0x00008000 (block 726) are added to produce the legacy linear address 730, wherein the upper 16 bits and the lower 16 bits are 0x0555 and 0x2000, respectively. The addition also produces an output carry 732 equal to a logic ONE, which is blocked for 16-bit legacy address generation. Thus, the legacy linear address generated for this example is 0x05552000 (block 730).

In the example of FIG. 7, the legacy 16-bit effective address is generated as follows. The displacement value 0xC000 (block 734), the base value 0xC000 (block 736) and the index value 0x6000 (block 738) are summed via a 3:2 carry save adder. The result is a sum output 740 equal to 0x6000 and a carry output 742 equal to 0x8000. The adder also produces an output carry 744 that is equal to a logic ONE. Finally, the sum output value 0x6000 (block 740) and the carry output value 0x8000 (block 742) are added to produce a legacy effective address 746 having a value of 0xE000 for this example. The addition also produces an output carry 748 equal to a logic ZERO.

Next, the output carries generated in the example of FIG. 7 are compared to determine whether the generated legacy linear address is correct. Computing the XOR of the output carries 718, 728, 732, 744 and 748 yields: 1 XOR 0 XOR 1 XOR 1 XOR 0=logic ONE. Thus, as described above, the legacy linear address generated using a force carry input 710 equal to a logic ZERO is incorrect. This result may be verified mathematically by adding the effective address and the segment, i.e., 0xE000+0x05554000=0x05562000. However, the generated legacy linear address is 0x05552000, which indicates that a carry was incorrectly blocked (see block 750).

FIG. 8 shows the second attempt at generating the legacy addresses for the example shown in FIG. 7. Because FIGS. 7 and 8 represent two phases of the same example legacy address generation, a detailed description of the intermediate computations for the linear address and the effective address will not be re-described herein. Instead, the interested reader is referred to the previous description of FIG. 7 for a complete discussion of the operations. To assist the reader in the exercise, substantially equivalent blocks are labeled with identical reference numerals.

FIG. 8 corresponds to the second attempt at generating the legacy linear address and, therefore, the force carry input 710 is now set to a logic ONE. As expected, the computation of the legacy 16-bit effective address remains unchanged, and yields the effective address of 0xE000 (block 746). In the computation of the legacy linear address, the force-carry input value of logic ONE (block 710) propagates through the intermediate additions for the upper 16 bits, and results in a generated legacy linear address of 0x05562000 (block 730), which is the correct result.

In the preceding examples of FIGS. 6 to 8, the force-carry input (e.g., 616 of FIG. 6 and 710 of FIGS. 7 and 8) is depicted as modifying the value of the displacement (e.g., 610 of FIG. 6 and 712 of FIGS. 7 and 8). In practice, an equivalent operation may be achieved by forcing a logic ONE on the input carry for the upper 16 bits of the appropriate adder (i.e., the addition of the $17^{th}$ bit positions of the arguments being summed). Also, the force-carry input may be applied to any convenient adder in the set of adders used to generate the linear address (e.g., any of the adders 314, 320 and 326 of FIG. 3).

Figure 9:
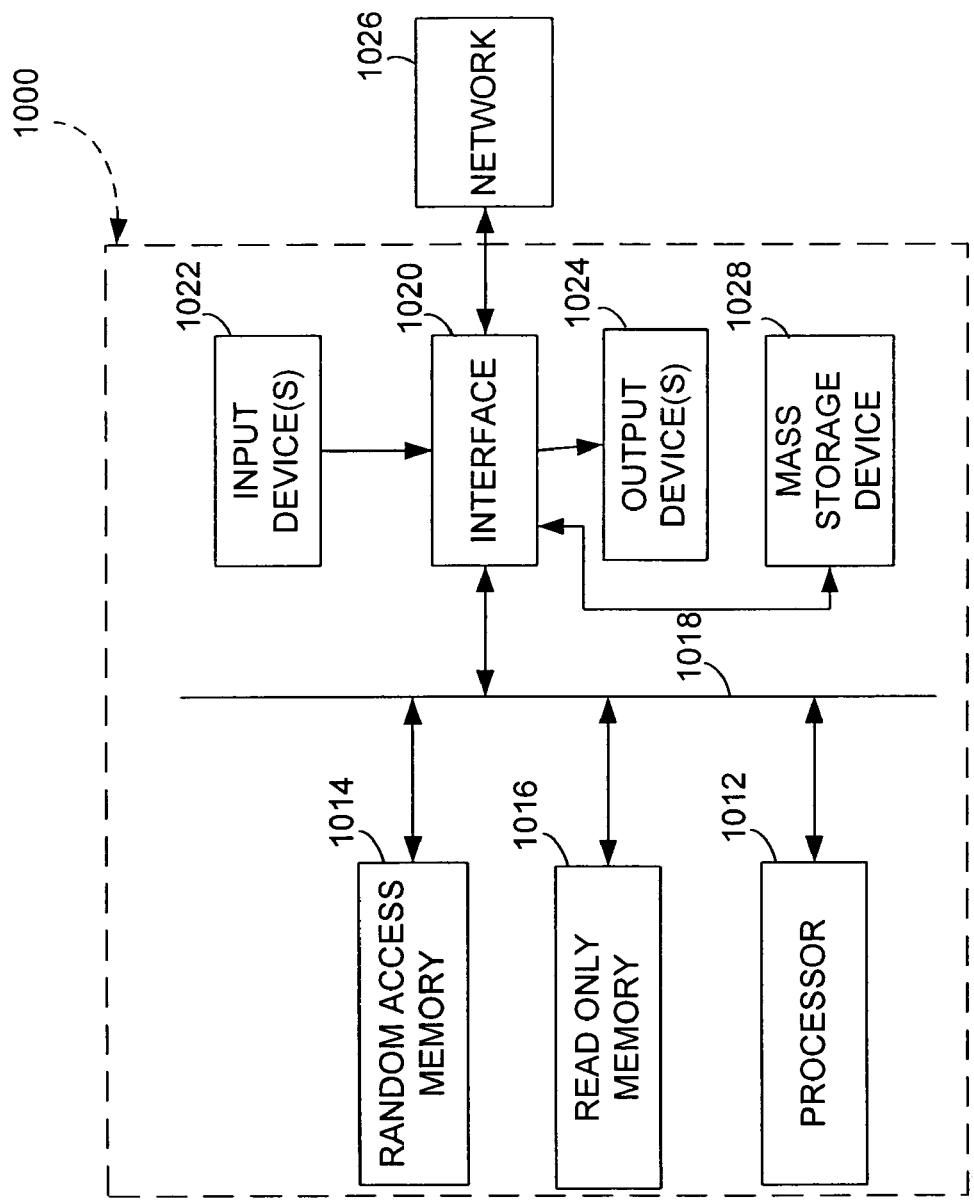
FIG. 9 is a schematic illustration of an example computer system in which the processor of FIG. 2 may be employed.

FIG. 9 is a block diagram of an example computer system 1000 capable of implementing the apparatus and/or methods disclosed herein. The computer system 1000 can be, for example, a server, a personal computer, a personal digital assistant (PDA), an Internet appliance, or any other type of computing device.

The computer system 1000 includes a processor 1012 which may be implemented by the example processor 200 of FIG. 2. The processor 1012 is in communication with a main memory including a volatile memory 1014 and a non-volatile memory 1016 via abus 1018. The volatile memory 1014 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1024 are also connected to the interface circuit 1020. The output devices 1024 can be implemented, for example, by display devices (e.g., a liquid crystal display, a cathode ray tube display (CRT)), by a printer and/or by speakers. The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. Referring to FIG. 2, the mass storage device 1028 may be used to store the address components 204 provided to the address generator 206 by the instruction scheduler 202. Alternatively or additionally, the volatile memory 1014 may be used to store the address components 204.

One having ordinary skill in the art will appreciate that the methods and apparatus described herein can be applied to a wide range of processors. For example, these methods and apparatus can be applied to processors architected to support addresses other than the example 16-bit and 32-bit processors described herein.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. An address generator comprising:
   an adder to add a first address component value and a second address component value to generate a first address;
   a correction indicator to indicate if the first address is correct; and
   a control input to modify an operation of the adder, wherein the control input causes the adder to add the first address component value and the second address component value to generate a second address if the correction indicator indicates the first address is incorrect.

2. An address generator as defined in claim 1 wherein the operation of the adder comprises determining a carry bit.

3. An address generator as defined in claim 2 wherein the control input modifies the operation of the adder to force the carry bit to be equal to one of a logic ZERO or a logic ONE.

4. An address generator as defined in claim 1 wherein the correction indicator generates a control output based on a set of carry bits in the adder.

5. An address generator as defined in claim 4 wherein the correction indicator generates the control output based on an exclusive OR operation performed on the set of carry bits.

6. An address generator as defined in claim 1 wherein the control input is a first control input, and further comprising a second control input to specify a size of the address.

7. An address generator as defined in claim 6 wherein the adder blocks a set of carry bits in the adder based on the second control input.

8. An address generator as defined in claim 6 wherein the correction indicator generates a control output based on the second control input.

9. An address generator as defined in claim 1 wherein the adder comprises a first adder and a second adder, and wherein the correction indicator generates a control output based on a first set of carry bits in the first adder and a second set of carry bits in the second adder.

10. An address generator as defined in claim 1, wherein the first address is associated with executing an instruction when the first address is correct, and wherein the second address is associated with executing the instruction when the first address is incorrect.

11. An apparatus comprising:
an instruction scheduler to schedule a set of address component values to process;
an address generator to generate a first address from the set of address component values; and
a recovery unit to determine whether the first address is correct, and to modify an operation of the address generator to cause the address generator to generate a second address from the set of address component values if the first address is incorrect.

12. An apparatus as defined in claim 11 wherein the address generator comprises an adder to generate one of the first address and the second address by adding the set of address component values.

13. An apparatus as defined in claim 12 wherein the address generator further comprises a control input to modify an operation of the adder.

14. An apparatus as defined in claim 13 wherein the operation comprises determining a carry bit.

15. An apparatus as defined in claim 14 wherein the control input modifies the operation to force the carry bit to be equal to one of a logic ZERO and a logic ONE.

16. An apparatus as defined in claim 13 wherein the recovery unit sets the control input to a value if the first address is incorrect.

17. An apparatus as defined in claim 16 wherein the value is based on a previous value of the control input.

18. An apparatus as defined in claim 13 wherein the instruction scheduler sets the control input to a value.

19. An apparatus as defined in claim 11 wherein the address generator further comprises a control output, and wherein the recovery unit determines whether the first address is correct based on the control output.

20. An apparatus as defined in claim 19 wherein the address generator further comprises an adder to generate one of the first address and the second address by adding the set of address component values, and wherein the control output is based on a set of carry bits in the adder.

21. An apparatus as defined in claim 13 wherein:
the address generator further comprises a first control output and a second control output;
the recovery unit determines whether the first address is correct based on the first control output; and
the recovery unit sets the value of the control input based on the second control output.

22. An apparatus as defined in claim 21 wherein the second control output of the address generator is based on a previous value of the control input.

23. An apparatus as defined in claim 13 wherein the control input is a first control input, and wherein the address generator further comprises a second control input to specify a size of the address.

24. An apparatus as defined in claim 23 wherein the adder blocks a set of carry bits in the adder based on the second control input.

25. An apparatus as defined in claim 23 wherein the address generator further comprises a control output, and wherein the control output is based on the second control input.

26. An apparatus as defined in claim 11 wherein the instruction scheduler, the address generator and the recovery unit are located in a processor, and further comprising a dynamic random access memory coupled with the processor.

27. A method comprising:
performing a first addition of a first address component value and a second address component value to generate a first address;
determining whether the first address is correct; and
modifying an operation in a second addition of the first address component value and the second address component value to generate a second address if the first address is incorrect.

28. A method as defined in claim 27 wherein the operation comprises determining a carry bit.

29. A method as defined in claim 28 wherein modifying the operation comprises forcing the carry bit to a value.

30. A method as defined in claim 29 wherein the value is one of a logic ZERO and a logic ONE.

31. A method as defined in claim 29 wherein the value is based on a previous value of the carry bit.

32. A method as defined in claim 29 wherein the value is based on at least one of the first address component value and the second address component value.

33. A method as defined in claim 27 wherein determining whether the first address is correct comprises evaluating a set of carry bits in the first addition of the first address component value and the second address component value.

34. A method as defined in claim 33 wherein determining whether the first address is correct comprises performing an exclusive OR operation on the set of carry bits.

35. A method as defined in claim 27 wherein determining whether the first address is correct is based on a size of one of the first address or the second address.

36. A method as defined in claim 27, wherein the first address is associated with executing an instruction when the first address is correct, and wherein the second address is associated with executing the instruction when the first address is incorrect.

37. A method as defined in claim 27 wherein performing one of the first addition or the second addition comprises modifying an operation in the one of the first addition or the second addition.

38. A method as defined in claim 37 wherein the operation comprises determining a set of carry bits, and wherein modifying the operation comprises forcing a bit in the set of carry bits to a value.

39. A method as defined in claim 38 wherein the value is one of a logic ZERO and a logic ONE.

40. A method as defined in claim 37 wherein modifying the operation is based on a size of the one of the first address and the second address.

41. A method as defined in claim 40 wherein the size is one of a first size or a second size.

* * * * *